United States Patent
Wang et al.

(10) Patent No.: US 12,440,976 B2
(45) Date of Patent: Oct. 14, 2025

(54) ROBOT CONTROLLER

(71) Applicant: FANUC CORPORATION, Yamanashi (JP)

(72) Inventors: Yuelai Wang, Yamanashi (JP); Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 233 days.

(21) Appl. No.: 18/015,268

(22) PCT Filed: Aug. 20, 2021

(86) PCT No.: PCT/JP2021/030483
§ 371 (c)(1),
(2) Date: Jan. 9, 2023

(87) PCT Pub. No.: WO2022/039245
PCT Pub. Date: Feb. 24, 2022

(65) Prior Publication Data
US 2023/0256598 A1    Aug. 17, 2023

(30) Foreign Application Priority Data

Aug. 21, 2020    (JP) .................. 2020-140085

(51) Int. Cl.
*B25J 9/16* (2006.01)
*B25J 13/08* (2006.01)

(52) U.S. Cl.
CPC ........... *B25J 9/1643* (2013.01); *B25J 9/1612* (2013.01); *B25J 13/088* (2013.01); *G05B 2219/40354* (2013.01)

(58) Field of Classification Search
CPC ...... B25J 9/1643; B25J 9/1612; B25J 13/088; B25J 9/1664; G05B 2219/40328; G05B 2219/40354
See application file for complete search history.

(56) References Cited

U.S. PATENT DOCUMENTS

| | | | |
|---|---|---|---|
| 6,456,901 B1* | 9/2002 | Xi | B25J 9/1607 901/41 |
| 2015/0148950 A1* | 5/2015 | Nammoto | B25J 9/1643 700/245 |

(Continued)

FOREIGN PATENT DOCUMENTS

| JP | H04169909 A | 6/1992 |
|---|---|---|
| JP | H08241108 A | 9/1996 |

(Continued)

*Primary Examiner* — Sohana Tanju Khayer
(74) *Attorney, Agent, or Firm* — Renner, Otto, Boisselle & Sklar, LLP

(57) ABSTRACT

A robot controller including a control unit configured to cause a control point to move from a first position to a second position by basic joints and wrist joints, and a recording unit configured to record position information including the second position and rotation angles to which the wrist joints are rotated when the control point is positioned at the second position. In a case where posture of the wrist unit at the second position is not a singular point, the control unit causes the basic joints and the wrist joints to perform straight-line motion so as to move the control point along a straight line, and in a case where the posture of the wrist unit at the second position is a singular point, the control unit causes the wrist joints to perform each-joint controlling motion.

5 Claims, 2 Drawing Sheets

(56) References Cited

U.S. PATENT DOCUMENTS

| | | | |
|---|---|---|---|
| 2017/0225324 A1* | 8/2017 | Yoon | B25J 18/06 |
| 2018/0056512 A1* | 3/2018 | Watts | B25J 9/1664 |
| 2018/0065254 A1* | 3/2018 | Okahisa | B25J 9/06 |
| 2018/0233397 A1* | 8/2018 | Hosek | B25J 9/1664 |
| 2020/0139546 A1* | 5/2020 | Kerfeld | B25J 11/0055 |
| 2021/0001483 A1* | 1/2021 | Milenkovic | B25J 9/1666 |
| 2021/0107148 A1* | 4/2021 | Imanishi | B25J 9/1666 |
| 2022/0379468 A1* | 12/2022 | Hansen | G05B 19/423 |
| 2023/0191603 A1* | 6/2023 | Thomsen | B25J 9/1664 |
| | | | 700/257 |

FOREIGN PATENT DOCUMENTS

| | | |
|---|---|---|
| JP | H11226886 A | 8/1999 |
| JP | 2015066668 A | 4/2015 |
| JP | 2018027580 A | 2/2018 |
| JP | 2018111155 A | 7/2018 |
| WO | WO-2016135861 A1 | 9/2016 |
| WO | WO-2017002208 A1 | 1/2017 |

* cited by examiner

ROBOT CONTROLLER

TECHNICAL FIELD

The present invention relates to a robot controller.

BACKGROUND ART

Conventionally, there has been a known articulated robot control method that involves moving a specific part of a robot along a specific continuous trajectory by moving multiple joints in a coordinated manner (for example, see PTL 1 to PTL 4). For example, a first position and a second position are taught, and multiple joints are controlled so that a control point, such as a tool center point (TCP), moves in a straight line from the first position to the second position on a straight-line trajectory.

CITATION LIST

Patent Literature

{PTL 1}
  Japanese Unexamined Patent Application, Publication No. 2018-111155
{PTL 2}
  International Publication No. WO 2016/135861
{PTL 3}
  International Publication No. WO 2017/002208
{PTL 4}
  Japanese Unexamined Patent Application, Publication No. 2015-066668

SUMMARY

When a robot is moving along a continuous trajectory, the posture of the robot could approach a singular point, and at least one joint could move suddenly. In such a case, the robot controller determines that an error has occurred and performs a procedure such as stopping the movement of the robot. Thus, every time an error occurs, additional work for reteaching a different trajectory and restarting the robot, etc., will become necessary.

An aspect of the present disclosure is a robot controller configured to control an articulated robot, the articulated robot having a plurality of basic joints that change a position of a wrist unit, and a plurality of wrist joints that change a position and posture of a control point set in the wrist unit or in an end effector connected to the wrist unit, the robot controller including: a control unit configured to cause the control point to move from a first position to a second position by controlling the plurality of basic joints and the plurality of wrist joints; and a position information recording unit configured to record position information that includes a position of the second position and rotation angles to which the plurality of wrist joints are rotated when the control point is positioned at the second position, wherein, in a case where posture of the wrist unit when the control point is at the second position is not a singular point, the control unit causes the plurality of basic joints and the plurality of wrist joints to perform straight-line motion in a coordinated manner so as to move the control point to the second position along a straight line, and in a case where the posture of the wrist unit when the control point is at the second position is a singular point, the control unit causes the plurality of wrist joints to perform each-joint controlling motion without coordination so as to move the control point to the second position.

DESCRIPTION OF EMBODIMENTS

A robot controller according to an embodiment will be described with reference to the drawings.

Figure 1:
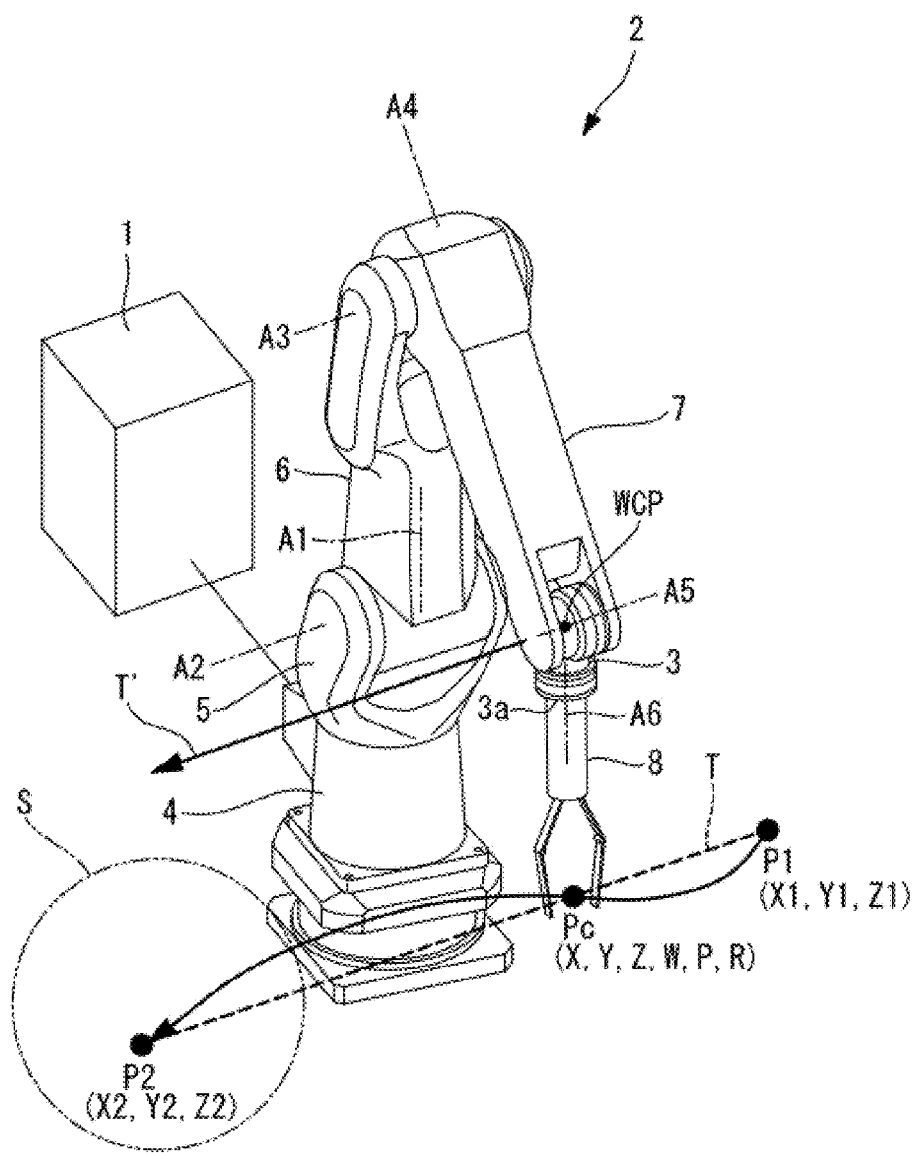
FIG. 1 is a diagram illustrating a robot to be controlled by a robot controller.
Figure 2:
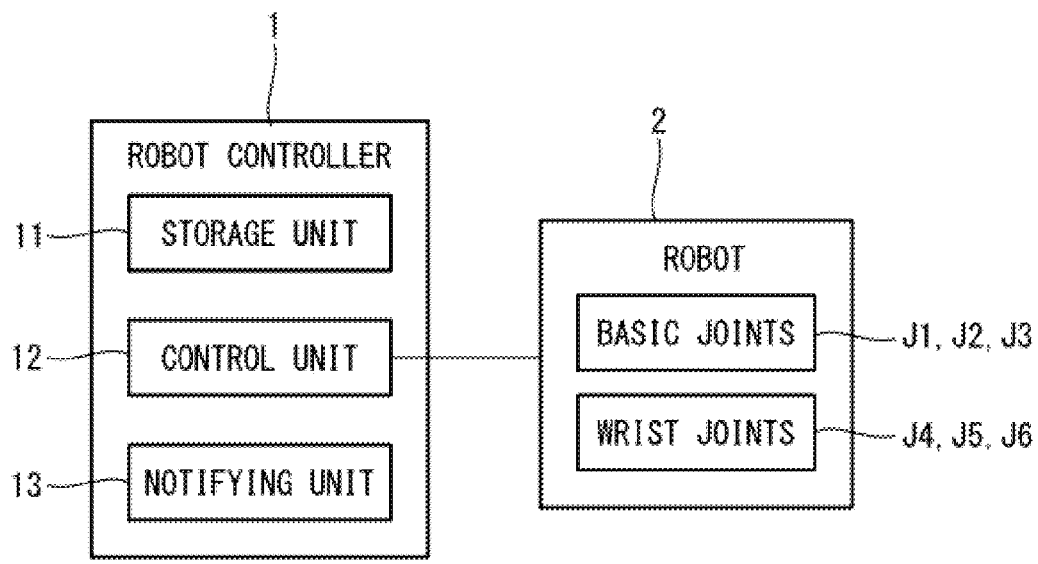
FIG. 2 is a block diagram of the robot controller.
Figure 3:
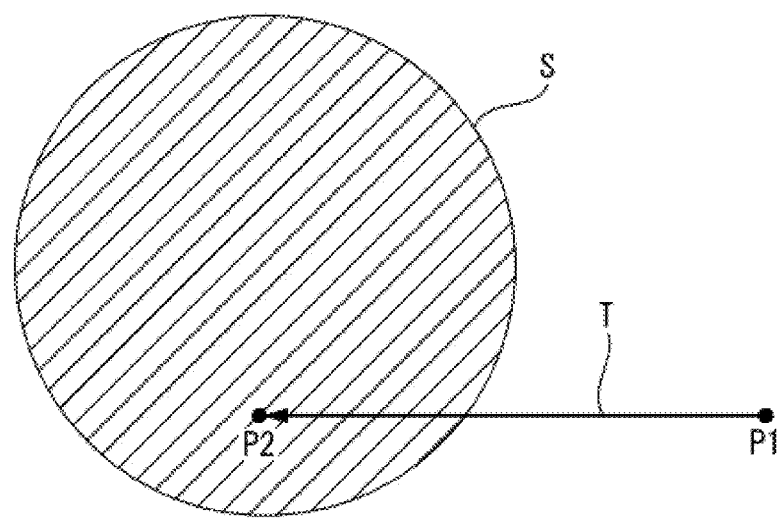
FIG. 3 is a diagram illustrating another example of a trajectory of a control point from a first position to a second position.

As illustrated in FIGS. 1 and 2, a robot controller 1 is connected to an articulated robot 2 equipped with a wrist unit 3 and controls the robot 2.

The robot 2 is equipped with multiple basic joints J1, J2, and J3 that three-dimensionally change the position of the wrist unit 3, and multiple wrist joints J4, J5, and J6 that three-dimensionally change the position (X, Y, Z) and the posture (W, P, R) of a control point Pc. The control point Pc is a point set at a predetermined position in the wrist unit 3 or a point set at a predetermined position in an end effector 8 connected to the wrist unit 3. For example, the control point Pc is a center point of a tip surface 3a of the wrist unit 3 or a tool center point (TCP).

In this embodiment, the robot 2 is a six-axis vertical articulated robot that has six joints J1 to J6. The robot 2 has a base 4 to be fixed to the floor, a rotary barrel 5 attached to the base 4, a first arm 6 connected to the rotary barrel 5, and a second arm 7 connected to a tip of the first arm 6. The wrist unit 3 is connected to a tip of the second arm 7, and has a tip surface 3a to which an end effector 8 such as a hand or a tool can be attached.

The joints J1 to J6 are respectively equipped with servo motors that drive the joints J1 to J6 according to control commands from the robot controller 1, and encoders that detect the rotation angles of the joints J1 to J6.

The basic joints are the first joint J1, the second joint J2, and the third joint J3. The first joint J1 causes the rotary barrel 5 to rotate with respect to the base 4 about a first axis A1 that extends in a vertical direction. The second joint J2 causes the first arm 6 to rotate with respect to the rotary barrel 5 about a second axis A2 that extends horizontally. The third joint J3 causes the second arm 7 to rotate with respect to the first arm 6 about a third axis A3 that extends horizontally.

The wrist joints are the fourth joint J4, the fifth joint J5, and the sixth joint J6. The fourth joint J4 causes the second arm 7 to rotate with respect to the first arm 6 about a fourth axis A4. The fifth joint J5 causes the wrist unit 3 to rotate with respect to the second arm 7 about a fifth axis A5. The sixth joint J6 causes the tip surface 3a of the wrist unit 3 to rotate about a sixth axis A6. The fourth axis A4 extends along the longitudinal axis of the second arm 7, the fifth axis A5 is orthogonal to the fourth axis A4, and the sixth axis A6 is orthogonal to the fifth axis A5.

As illustrated in FIG. 2, the robot controller 1 is equipped with a storage unit 11 and a control unit 12.

The storage unit 11 has storage devices such as a random access memory (RAM), a read-only memory (ROM), and a hard disk drive (HDD). The robot controller 1 has at least one processor such as a central processing unit. The storage unit 11 stores a control program that causes the processor to execute the processes of the control unit 12 described below. In other words, the control unit 12 is realized by at least one processor.

The control unit 12 performs linear interpolation between the first position P1 and the second position P2 to calculate a straight-line trajectory T that extends in a straight line from the first position P1 to the second position P2. The first position P1 and the second position P2 are any desired three-dimensional positions set by the operator, and are, for example, teaching points taught through a teaching operation such as direct teaching.

The control unit 12 controls the joints J1 to J6 to move the control point Pc from the first position P1 to the second position P2.

Prior to moving the control point Pc, the control unit 12 calculates, by inverse kinematics, the rotation angles of the wrist joints J4, J5, and J6 to be rotated when the control point Pc having the set posture is at the second position P2. The posture of the control point Pc (the posture of the tip surface 3a) is set by the operator as with the first position P1 and the second position P2. The position information that includes the calculated rotation angles of the wrist joints J4, J5, and J6 and the three-dimensional position (X2, Y2, Z2) of the second position P2 is stored (recorded) in the storage unit (position information recording unit) 11.

The control unit 12 determines whether or not the posture of the wrist unit 3 when the control point Pc is at the second position P2 is a singular point or near a singular point. Next, the control unit 12 causes the joints J1 to J6 to perform straight-line motion or each-joint controlling motion depending on the determination result so as to move the control point Pc from the first position P1 to the second position. The method in which the control unit 12 controls the joints J1 to J6 will be described later.

In the reference drawings, a region S indicates a singular point region where the posture of the wrist unit 3 is a singular point or near a singular point. In this embodiment, the singular point is a posture with which the fourth axis A4 and the sixth axis A6 are aligned in the same line. When the posture of the wrist unit 3 is positioned at a singular point, the movement of the wrist unit 3 can no longer be controlled.

For example, on the basis of the position information stored in the storage unit 11, the control unit 12 calculates the rotation angle θ between the fourth axis A4 and the sixth axis A6 formed when the control point Pc is at the second position P2. Then, when the rotation angle θ is equal to or lower than a predetermined threshold, for example, 5° or less, the control unit 12 determines that the posture of the wrist unit 3 when the control point Pc is at the second position P2 is a singular point or near a singular point.

Next, the operation of the robot controller 1 is described.

For example, when teaching a trajectory of the control point Pc to the robot controller 1, the operator sets a first position P1 (X1, Y1, Z1) and a second position P2 (X2, Y2, Z2) as the teaching positions, and sets a posture (W1, P1, R1) of the control point Pc as the teaching posture. The first position P1 (X1, Y1, Z1), the second position P2 (X2, Y2, Z2), and the posture (W1, P1, R1) are stored in the storage unit 11.

Next, the control unit 12 determines whether or not the posture of the wrist unit 3 when the control point Pc which is at the second position P2 with the set posture (W1, P1, R1) is positioned at a singular point. Next, the control unit 12 controls the joints J1 to J6 so as to move the control point Pc from the first position P1 to the second position P2 by straight-line motion or each-joint controlling motion of the joints J1 to J6.

When the posture of the wrist unit 3 when the control point Pc is at the second position P2 is not positioned at a singular point, the control unit 12 causes the joints J1 to J6 to perform straight-line motion in a coordinated manner so that the control point Pc keeping the posture (W1, P1, R1) is moved in a straight line from the first position P1 (X1, Y1, Z1) to the second position P2 (X2, Y2, Z2) along the straight-line trajectory T. Specifically, the control unit 12 calculates, by inverse kinematics, the rotation angles of the joints J1 to J6 for each of the positions of the control point Pc having the set posture (W1, P1, R1) on the straight-line trajectory T, and as a result obtains time-series data of rotation angles for moving the control point Pc keeping the posture (W1, P1, R1) in a straight line from the first position P1 to the second position P2. Next, the control unit 12 controls the joints J1 to J6 according to the time-series data of the calculated angles.

When the posture of the wrist unit 3 when the control point Pc is at the second position P2 is positioned a singular point, the control unit 12 causes the basic joints J1, J2, and J3 to perform straight-line motion while causing the wrist joints J4, J5, and J6 to perform each-joint controlling motion so as to move the control point Pc from the first position P1 to the second position P2. The straight-line motion of the basic joints J1, J2, and J3 is performed by controlling the joints J1, J2, and J3 according to the time-series data of the rotation angles of the joints J1, J2, and J3 acquired by the aforementioned method.

In the each-joint controlling motion, the control unit 12 calculates the differences between the rotation angles of the wrist joints J4, J5, J6 when the control point Pc having the set posture (W1, P1, R1) is positioned at the first position P1 and the rotation angles of the wrist joints J4, J5, J6 when the control point Pc having the set posture (W1, P1, R1) is positioned at the second position P2. Next, the control unit 12 moves each of the wrist joints J4, J5, and J6 independently by the calculated differences, in other words, without coordination. In the each-joint controlling motion, the control unit 12 may move the wrist joints J4, J5, and J6 in sequence or simultaneously.

Due to the straight-line motion of the basic joints J1, J2, and J3, the wrist center point (WCP) moves in a straight line along a trajectory T' parallel to the straight-line trajectory T. The WCP is a point where the axes A4, A5, and A6 of the wrist joints J4, J5, and J6 intersect one another. Furthermore, as a result of the each-joint controlling motion of the wrist joints J4, J5, and J6, the control point Pc moves from the first position P1 to the second position P2 while changing the posture (W, P, R), and reaches the second position P2 to be the set posture (W1, P1, R1).

As described above, according to the present embodiment, when the wrist unit 3 at the second position P2 is a singular point or near a singular point, the control point Pc is moved to the second position P2 by the each-joint controlling motion of the wrist joints J4, J5, and J6. Since the wrist joints J4, J5, and J6 move without coordination in the each-joint controlling motion, the control point Pc moves while changing the posture. In other words, while the control point Pc is moving from the first position P1 to the second position P2, the wrist unit 3 takes posture different from a singular point. Thus, while the wrist unit 3 is prevented from reaching a singular point or near a singular point, the control point Pc can be moved from the first position P1 to the second position P2.

It is difficult for the operator to recognize singular points of a moving robot 2, and thus the robot 2 may reach a singular point. Once the robot 2 is positioned at a singular point, sudden movement of a particular joint causes an error and stops the robot 2. In such a case, the operator must reset the second position P2 such that the robot 2 does not pass the singular point. Such a task is troublesome for the operator, and adversely affects the work efficiency. According to the present embodiment, whether or not the wrist unit 3 would reach a singular point is automatically determined, and the control point Pc moves from the first position P1 to the second position P2 while automatically avoiding the posture of the wrist unit 3 reaching a singular point or near a singular point. Thus, errors can be avoided, and the robot 2 can be smoothly taught.

Furthermore, when the control point Pc is moving toward the second position P2, the WCP moves along a straight line by the straight-line motion of the basic joints J1, J2, and J3. Thus, even when the wrist joints J4, J5, and J6 perform each-joint controlling motion, the position of the control point Pc does not notably deviate from the straight-line trajectory T, and the trajectory of the control point Pc becomes close to the straight-line trajectory T. Thus, the control point Pc can be moved along substantially the same trajectory as the straight-line trajectory T intended by the operator.

In the present embodiment, the robot controller 1 may be further equipped with a notifying unit 13 that generates a notification that the distance from the straight-line trajectory T to the control point Pc has exceeded a predetermined threshold. By the notification from the notifying unit 13, the operator can recognize that the position of the control point Pc has deviated from the straight-line trajectory T beyond the threshold, and, if necessary, can reset the first position P1 and the second position P2 to different positions.

For example, during the each-joint controlling motion of the wrist joints J4, J5, and J6, the control unit 12 calculates the three-dimensional position of the control point Pc from the rotation angles of the joints J1 to J6 detected with the encoders, and calculates the distance to the control point Pc from the straight-line trajectory T. When the calculated distance has exceeded the threshold, the notifying unit 13 notifies the operator of the fact that the distance has exceeded the threshold value by, for example, sounding an alarm. The control unit 12 may stop moving the robot 2 when the distance exceeds the threshold.

In the present embodiment, when the posture of the wrist unit 3 when the control point Pc is at the second position P2 is a singular point, the control unit 12 may keep the position of the control point Pc on the straight-line trajectory T and may cause the wrist joints J4, J5, and J6 to perform each-joint controlling motion so that the control point Pc moves on the straight-line trajectory T to the second position P2 while changing the posture.

According to this configuration, the wrist unit 3 is prevented from reaching a singular point, and the control point Pc can be moved along the same straight-line trajectory T as that for the straight-line motion.

In the present embodiment, when the posture of the wrist unit 3 when the control point Pc is at the second position P2 is a singular point, the control unit 12 causes the basic joints J1, J2, and J3 to perform straight-line motion; alternatively, when it is acceptable for the trajectory of the control point Pc from the first position P1 to the second position P2 to deviate extensively from the straight-line trajectory T, the basic joints J1, J2, and J3 can be made to perform each-joint controlling motion.

In the present embodiment, the robot 2 is a six-axis vertical articulated robot; alternatively, the robot 2 may be a vertical articulated robot that has any number of axes or may be a robot that has a different joint configuration.

The invention claimed is:

1. A robot controller configured to control an articulated robot, the articulated robot having a plurality of basic joints, and a wrist unit which is disposed at a distal portion of the articulated robot relative to the plurality of basic joints, the wrist unit having a plurality of wrist joints, and the articulated robot configured to change a position and orientation of a control point set in the distal portion or in an end effector connected to the distal portion, the robot controller comprising:

a control unit configured to cause the control point to move from a first position to a second position by controlling the plurality of basic joints and the plurality of wrist joints, wherein, in a case where posture of the wrist unit when the control point is at the second position is not a singular point, the control unit causes the plurality of basic joints and the plurality of wrist joints to move with a linear interpolation so as to move the control point to the second position along a straight line, and in a case where the posture of the wrist unit when the control point is at the second position is a singular point, the control unit causes the plurality of wrist joints to move with an each-joint controlling mode which is different from the linear interpolation while the control unit is causing the plurality of basic joints to move with the linear interpolation so as to move the control point to the second position.

2. The robot controller according to claim 1, wherein, in a case where the posture of the wrist unit when the control point is at the second position is a singular point, the control unit causes the plurality of wrist joints to move with the each-joint controlling mode while keeping the position of the control point on a straight-line trajectory connecting the first position and the second position so as to move the control point to the second position on the straight-line trajectory.

3. The robot controller according to claim 1, wherein the control unit is configured to control a notifying device which is configured to make a warning sound when a distance to the control point from a straight-line trajectory connecting the first position and the second position exceeds a predetermined threshold.

4. A robot controller configured to control an articulated robot, the articulated robot having a plurality of basic joints and a wrist unit, the wrist unit being disposed at a distal portion of the articulated robot relative to the plurality of basic joints, the wrist unit having a plurality of wrist joints constituted by three or two joints counted from the tip end of the articulated robot, the articulated robot configured to change a position and orientation of a control point set in the distal portion or in an end effector connected to the distal portion, the robot controller comprising:

a control unit configured to cause the control point to move from a first position to a second position by controlling the plurality of basic joints and the plurality of wrist joints, wherein, in a case where posture of the wrist unit when the control point is at the second position is not a singular point, the control unit causes the plurality of basic joints and the plurality of wrist joints to move with a linear interpolation so as to move the control point to the second position along a straight line, and in a case where the posture of the wrist unit when the control point is at the second position is a singular point, the control unit causes at least one of the plurality of wrist joints to rotate with an each-joint controlling mode which is different from the linear interpolation while the control unit is controlling the articulated robot so as to move the control point to the second position.

5. A robot controller, configured to control an articulated robot, the articulated robot having a plurality of basic joints and a wrist unit, the wrist unit being disposed at a distal portion of the articulated robot relative to the plurality of basic joints, the wrist unit having a plurality of wrist joints constituted by three or two joints counted from the tip end of the articulated robot, the articulated robot configured to change a position and orientation of a control point set in the distal portion or in an end effector connected to the distal portion, the robot controller comprising:

a control unit configured to cause the control point to move from a first position to a second position by controlling the plurality of basic joints and the plurality of wrist joints, wherein, in a case where posture of the wrist unit when the control point is at the second position is not a singular point, the control unit causes the plurality of basic joints and the plurality of wrist joints to move with a linear interpolation so as to move the control point to the second position along a straight line, and in a case where the posture of the wrist unit when the control point is at the second position is a singular point, the control unit causes the plurality of wrist joints to move with an each-joint controlling mode which is different from the linear interpolation while the control unit is controlling the articulated robot to move to the second position, wherein the robot controller is configured to control the wrist unit having a first wrist joint which is the third joint counted from the tip end of the articulated robot and which rotates around a first axis, a second wrist joint which is the second joint counted from the tip end and which rotates around a second axis, and a third wrist joint which is the most distal joint in the articulated robot and which rotates around a third axis, and wherein the fourth joint counted from the tip end is involved in the plurality of basic joints.

* * * * *